(12) United States Patent
Condrau et al.

(10) Patent No.: US 7,261,501 B2
(45) Date of Patent: Aug. 28, 2007

(54) MACHINE TOOL WITH CONCERTINA COVER

(75) Inventors: Alexandre Condrau, Tavannes (CH); Lukas Weder, Ipsach (CH)

(73) Assignee: Mikron Agie Charmilles AG, Nidau (CH)

( * ) Notice: Subject to any disclaimer, the term of this patent is extended or adjusted under 35 U.S.C. 154(b) by 0 days.

(21) Appl. No.: 11/502,015

(22) Filed: Aug. 10, 2006

(65) Prior Publication Data

US 2007/0041802 A1 Feb. 22, 2007

(30) Foreign Application Priority Data

Aug. 19, 2005 (EP) ................................. 05018050

(51) Int. Cl.
*B23Q 11/08* (2006.01)
(52) U.S. Cl. .................. 409/134; 409/212; 74/612
(58) Field of Classification Search ................ 409/134, 409/202, 212, 135–137; 408/241 G; 451/451, 451/452, 455; 29/DIG. 56, DIG. 60; 74/608–609, 74/612–613
See application file for complete search history.

(56) References Cited

U.S. PATENT DOCUMENTS 3,824,890 A * 7/1974 Zettler et al. ............... 409/134

| 6,749,495 B2 * | 6/2004 | Grund et al. ................ 409/134 |
| 7,192,225 B2 * | 3/2007 | Takayama et al. ........... 409/134 |
| 2003/0026671 A1 * | 2/2003 | Green ......................... 409/134 |
| 2006/0269375 A1 * | 11/2006 | Takayama et al. ........... 409/134 |
| 2006/0270540 A1 * | 11/2006 | Takayama et al. ........... 409/134 |
| 2007/0042882 A1 * | 2/2007 | Konvicka et al. ............ 409/134 |

FOREIGN PATENT DOCUMENTS

| JP | 2001-087964 A | * | 4/2001 |
| JP | 2002-137143 A | * | 5/2002 |
| JP | 2006-095666 A | * | 4/2006 |
| WO | WO 01/38044 | | 5/2001 |

* cited by examiner

*Primary Examiner*—Erica Cadugan
(74) *Attorney, Agent, or Firm*—Bachman & LaPointe, P.C.

(57) ABSTRACT

A machine tool comprising a cabin (5) provided with side walls (1, 2) and doors (3, 4), a slide (6) for the reception of a spindle head in which tools are clamped, and with a concertina (7) serving as a roof cover, the concertina (7), by means of the slide (6), being able to be unfolded, folded up and/or transported parallel to the longitudinal side (14) of the slide (6) and perpendicular to the side walls (1, 2).

5 Claims, 3 Drawing Sheets

MACHINE TOOL WITH CONCERTINA COVER

BACKGROUND OF THE INVENTION

The invention relates to a machine tool comprising a cabin provided with side walls and doors, a slide for the reception of a spindle head in which tools are clamped, and with a concertina serving as a roof cover.

A machine tool with concertina is known from EP 1 146 994 B1. The machine tool comprises a work chamber which is closed off by walls and a roof cover and in which a workpiece-receiving apparatus and a spindle head with a main spindle are disposed, in which latter tools for the machining of the workpiece can be clamped. The apparatus and the spindle head are transportable relative to one another. In a front wall, an opening is provided which can be closed by a door and leads into the work chamber. At least a part of the roof cover can be transported between two settings such that it, in a first setting, closes off the work chamber in the upward direction and, in a second setting, opens up the work chamber in the upward direction for loading.

The object of the present invention lies, in particular, in proposing a roof cover for a machine tool, which can be quickly and easily actuated without separate drive mechanism, which, when the roof of the machine is opened, provides the maximum possible free space for the loading and unloading of tools and/or workpieces, and which, when the roof of the machine tool lies closed, provides the necessary closure to the outside whilst the machine tool is in operation.

SUMMARY OF THE INVENTION

According to the invention, the object is achieved by the fact that the concertina, by means of the slide, can be unfolded, folded up and/or transported parallel to the longitudinal side of the slide and perpendicular to the side walls.

This has the advantage that no special drive is needed to actuate the concertina. The concertina is unfolded or folded up by means of the slide motion as it is carried along.

Advantageously, the concertina can be detachably connected by the longitudinal side to the slide and/or to the cabin. According to requirement, the concertina can be connected by the longitudinal side to the slide and/or to the cabin in order to unfold, push together or transport the concertina.

In order displaceably to transport the concertina, interacting guide elements are preferably provided on the side walls and on the concertina.

According to a further preferred embodiment, the concertina and/or the slide and/or interacting connecting means to the longitudinal side of the cabin has/have, for example, electromagnetic or mechanical means.

The connecting means for connecting the concertina to the slide and/or to the longitudinal side of the cabin can preferably be activated by a remote control.

The roof cover is not limited to a concertina. For example, roller-blind-like, telescopic solutions, etc. can also be used.

BRIEF DESCRIPTION OF THE DRAWINGS

An illustrative embodiment is represented in the drawing and is described below, wherein.

DETAILED DESCRIPTION

Figure 1:
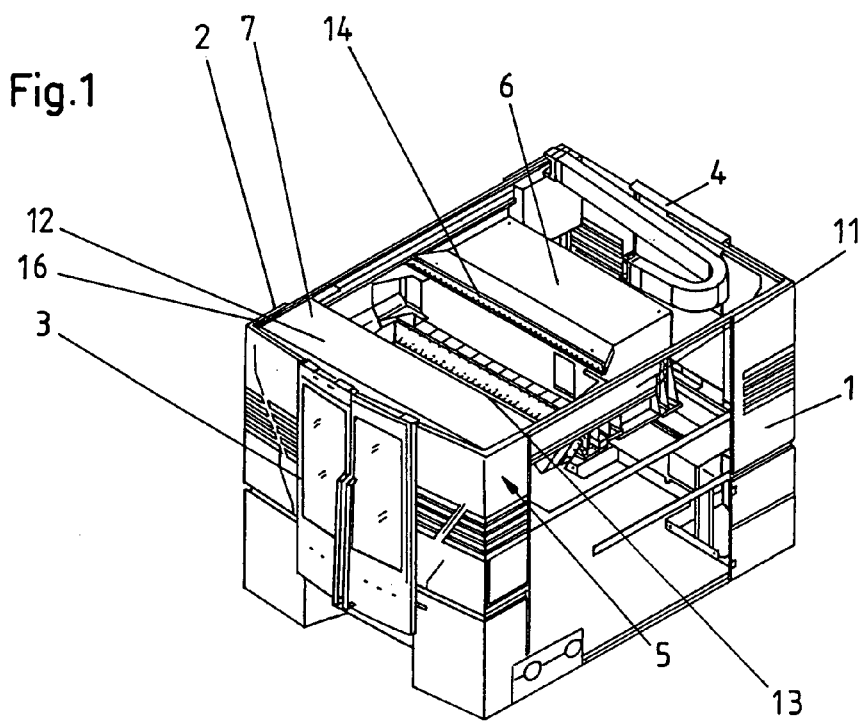
FIG. 1 shows a machine cabin with partially unfolded concertina.
Figure 2:
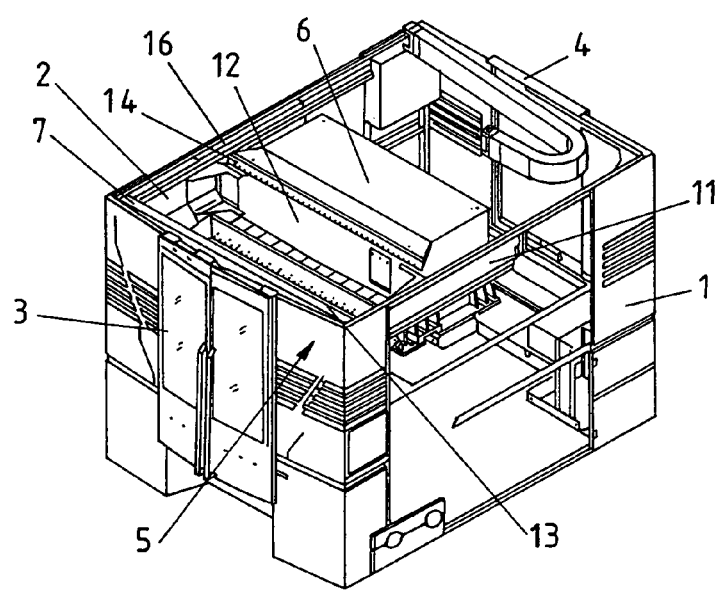
FIG. 2 shows a machine cabin with folded-up concertina.
Figure 3:
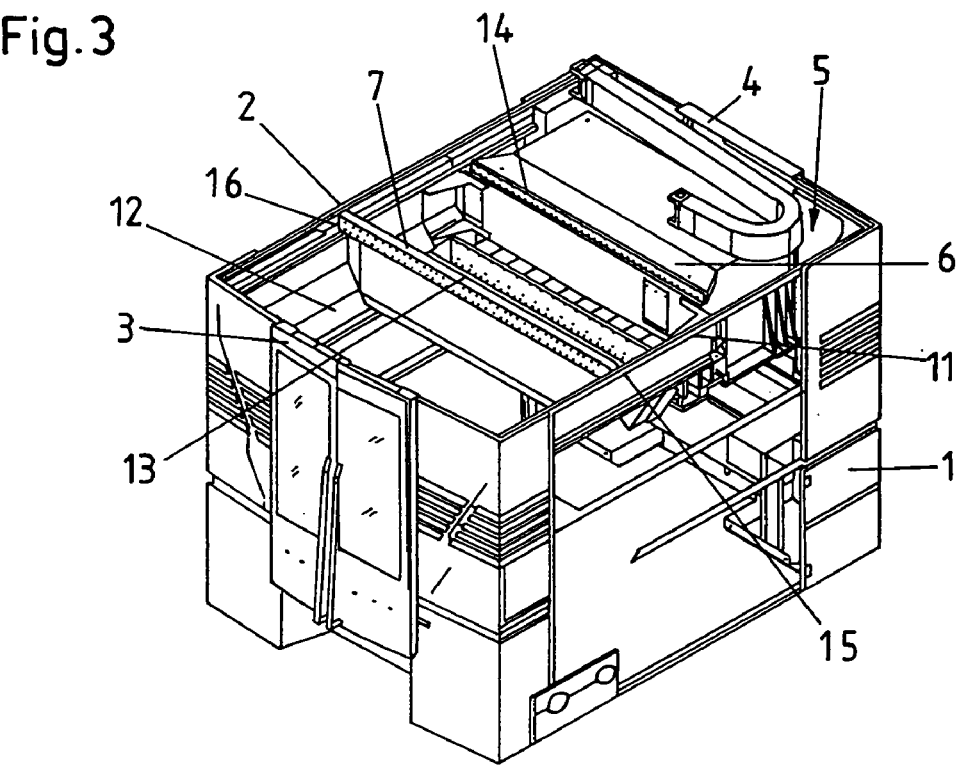
FIG. 3 shows a machine cabin with concertina pushed into the middle.
Figure 4:
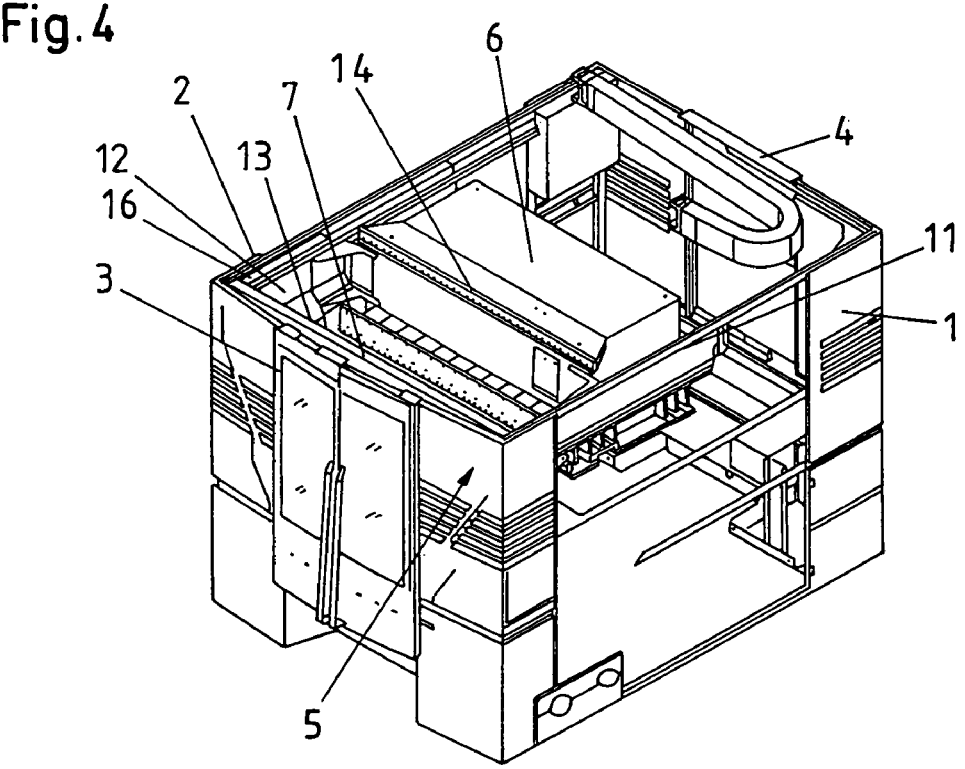
FIG. 4 shows a machine cabin with folded-up concertina.

In FIGS. 1 to 4, a cabin 5 of a machine tool is shown. The cabin 5 is configured as a cuboid, comprising the side walls 1 and 2 and the front and rear walls containing the doors 3 and 4. A slide 6 is guided on side rails 11. The slide 6 serves to receive a spindle head (not represented in the drawing) with tool for the machining of a workpiece (likewise not shown in the drawing). In FIG. 1, the roof surface 12 of the cabin 5 is partially covered in the front region by means of a concertina 7. The concertina 7 can be connected on its longitudinal side 13 to the front longitudinal side 14 of the slide 6 by connecting means 10, for example electromagnetically, by catches, etc. The magnets or the catches can be operated from a console (not represented). In the catch-locked state, the concertina 7 can be folded up and transported, as is shown by FIGS. 2 to 4. In FIG. 2, the concertina 7 is folded up and is located on the upper edge of the door side 3 of the cabin 5. In FIG. 3, the concertina 7 has been transported into the middle region 15 of the roof surface, the concertina 7 being guided on the rails 16. When the transomless door 3 is open, a large free space is thus created for the loading and unloading of parts. In FIG. 4, the state of the folded-up concertina 7 on the door side 3 of the cabin 5 can once again be seen.

Figure 5:
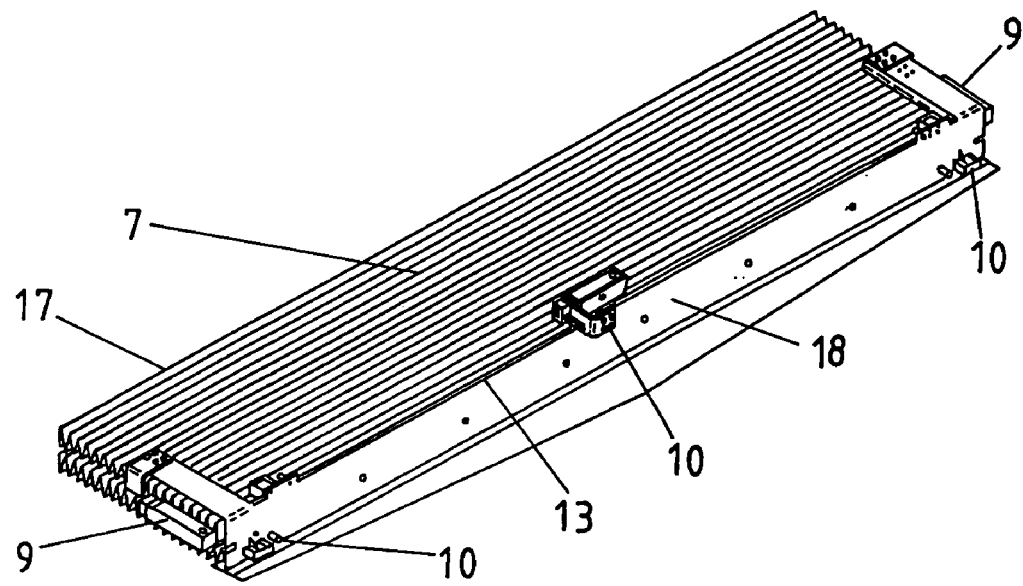
FIG. 5 shows a three-dimensional view of the concertina.
Figure 6:
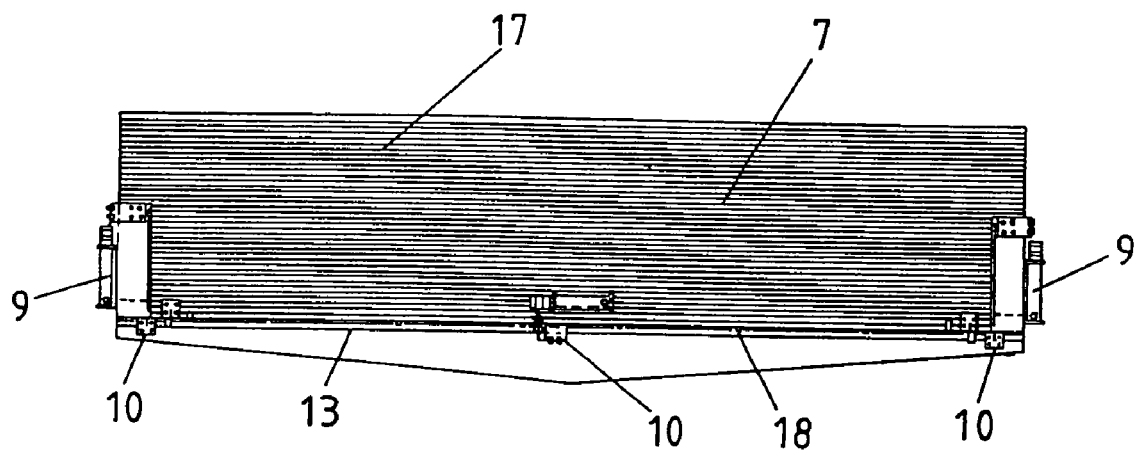
FIG. 6 shows a top view of the concertina.

In FIGS. 5 and 6, the concertina 7 is represented. The actual folding bellows 17 is framed by means of a cross bar 18. In the middle and on the sides of the cross bar 18, connecting means 10 are provided. These connecting means 10 can be electromagnetic devices or mechanical devices, for example catches. These connecting means 10 can be operated from a control desk on or outside the machine. On the side faces of the concertina 7, furthermore guide elements 9 are provided, for guiding the concertina 7 in the rails 16 of the cabin 5.

The advantages associated with the invention consist, in particular, in the fact the concertina, which can be actuated without separate drive mechanism, allows a large free space for the loading and unloading of the machining chamber. The cover according to the invention is particularly advantageous for the fact that the machine chamber is suitable for the crane-loading of heavy and bulky parts.

The invention claimed is:

1. Machine tool comprising:

a cabin (5) provided with side walls (1, 2) and doors (3, 4), a slide (6) for the reception of a spindle head in which tools are clamped, and a concertina (7) serving as a roof cover, the concertina (7) is detachably connected via automatically actuatable means (10) for detachably connecting the concertina (7) to the slide and is unfolded, folded up and/or transported perpendicular to a longitudinal side (14) of the slide (6) and parallel to the side walls (1, 2) by means of the slide.

2. Machine tool according to claim 1, wherein the means for detachably connecting the concertina (7) to the slide (6) are located between the longitudinal side (14) of the slide (6) and a longitudinal side (13) of the concertina (7).

3. Machine tool according to claim 1, wherein the concertina (7) is displaceable by means of guide elements (9, 16) on the concertina (7) and on the side walls (1, 2).

4. Machine tool according to claim 1, wherein the automatically actuatable means (10) for detachably connecting the concertina (7) to the slide are electromagnetically actuated.

5. Machine tool according to claim 1, wherein the connection of the concertina (7) to the slide (6) can be activated by a remote control.

* * * * *